Feb. 8, 1927.
C. W. PAUL
1,617,270
AUTOMOBILE MIRROR SYSTEM
Filed May 10, 1926
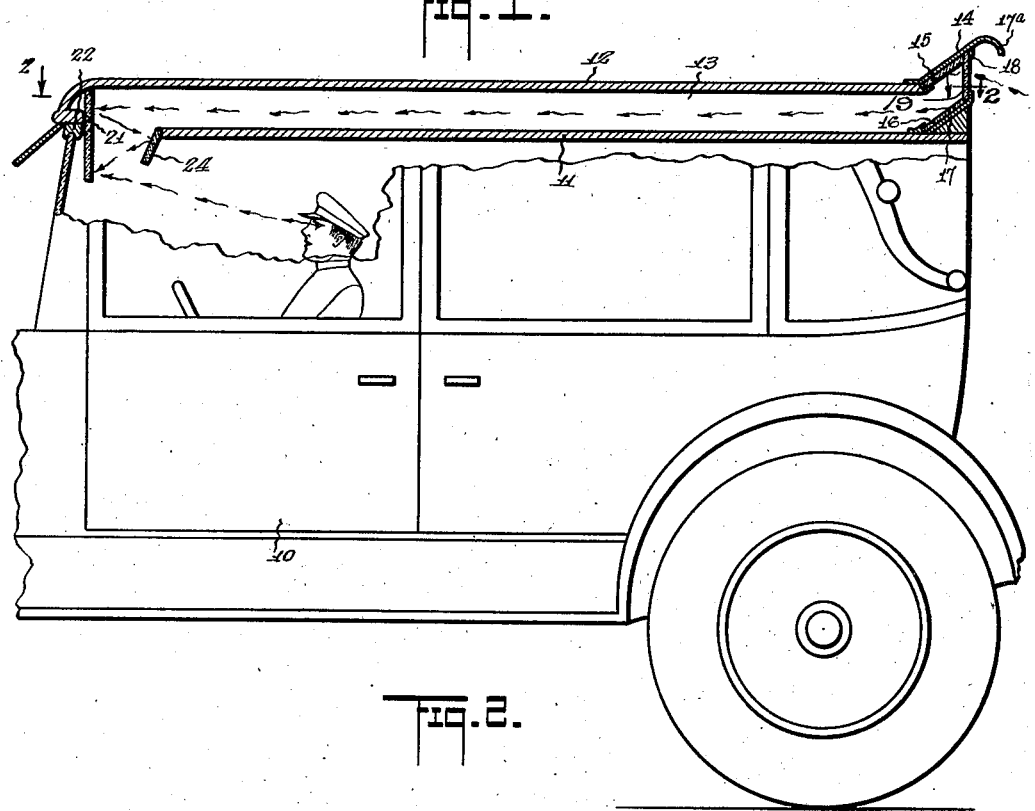
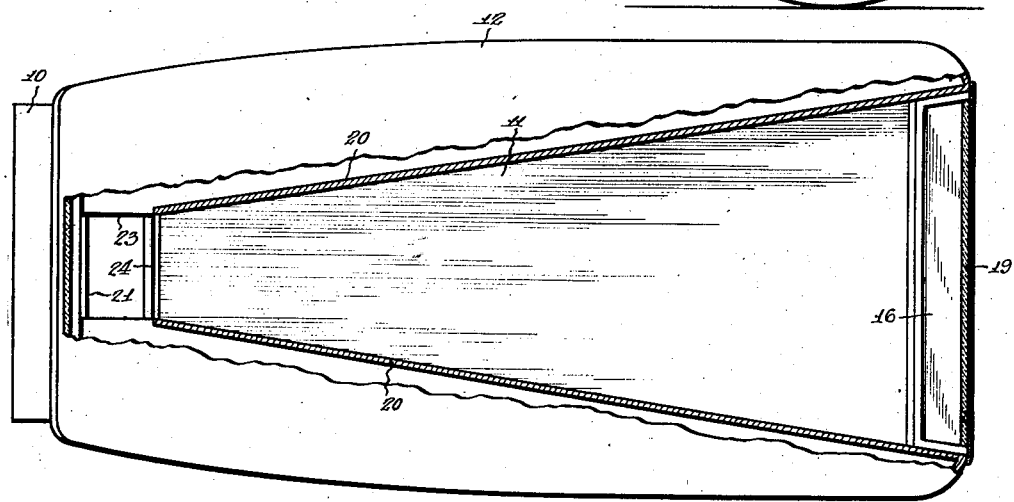
WITNESSES
INVENTOR
Carl W. Paul.
BY
ATTORNEYS Patented Feb. 8, 1927.

1,617,270

UNITED STATES PATENT OFFICE.

CARL W. PAUL, OF NEW YORK, N. Y.

AUTOMOBILE MIRROR SYSTEM.

Application filed May 10, 1926. Serial No. 108,092.

The present invention is concerned with the provision of a mirror system for automotive vehicles, so arranged that the driver of a car without turning his head may at all times have a full and unobstructed view of the road behind him.

An object of the invention is to provide a mirror system of this character which will not only prevent the common inconvenience of the occupants of the back seat of the car interfering with the view of the road in the mirror, but which will also afford considerable more privacy to the occupants of the rear seat, in that they will not be under the constant surveillance of the chauffeur as is now customary either where mirrors are used, or where the chauffeur must turn around to view the road behind him.

A further object of the invention is to provide a mirror system of the character above noted, so arranged that it will in on way render the car conspicuous, and so incorporated in the car as to not materially alter the conventional appearance thereof.

A further object of the invention is to provide a mirror system of simple, practical construction, which will be rugged, durable and efficient in use, which may be manufactured with comparative economy, and which may be installed in various conventional makes of automobiles without materially adding to the cost of manufacture of the latter.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a fragmentary side elevational view of an automotive vehicle embodying the present invention, the top of the car being broken away and in section to disclose the mirrors.

Fig. 2 is partially a top plan view of the car, and partially a view in longitudinal section on the line 2—2 of Fig. 1.

In the drawings, I have used the reference character 10 to designate an automotive vehicle which may be of generally conventional construction. The car is provided with a hollow top including a ceiling portion 11 and a roof portion 12 providing an unobstructed space 13 between them extending pratically the full length of the top. A series of mirrors is so arranged that the image of the road behind the car may be reflected through the space 13 to a mirror visible at all times to the chauffeur. Obviously numerous expedients might be resorted to in this connection, but I have devised one simple system of mirrors which will be inconspicuous in use, and which will prevent the possibility of foreign matter collecting on the space between the ceiling and the roof.

Secured to the rear end of the roof as by a bracket 14 is a rearwardly and upwardly extending mirror 15 disposed in parallelism with an oppositely facing rearwardly and upwardly extending mirror 16 supported on the rear end of the ceiling 11 by a bracket 17. The ends of the bracket 17 may conveniently define flanges 18 removably retaining a plate of glass 19 in vertical position, so that the entrance of foreign matter into the space 13 is prevented. Mirror 17 is shaded by an extension 17$^a$.

The space 13 is preferably subdivided by a pair of longitudinally extending partition members 20 to define a restricted area of greatest width at its rear end, through which images from the mirror 16 are reflected to a mirror 21 mounted at the front of the car.

Mirror 21 may be secured in any suitable manner to the upper portion of the windshield frame 22, and extends from the roof 12 to a point somewhat below the ceiling 11. The ceiling 11 is provided with a cut away portion 23 near its forward end, and on the rear edge of this cut away portion I mount a vertically disposed forwardly facing mirror 24 adapted to coact with the mirror 21.

As indicated by dotted lines in Fig. 1, the image of the road behind the car is reflected upon the mirror 14, thence downwardly to the mirror 16, forwardly to the upper portion of the mirror 21, rearwardly to the mirror 24, and forwardly to the lower portion of the mirror 21 where it may be conveniently observed by the chauffeur. It will be noted that the arrangement of mirrors is such, that the image will be right-side-up on the lower portion of the mirror 21. By properly arranging the inclination of the mirrors 15 and 16, a comprehensive view of the road may be had.

In the particular embodiment of the invention illustrated, the parts 14 and 17 which I have terminated "brackets" may conveniently constitute plate-like portions cooperatively defining an upwardly inclined housing member, the bottom and top of said housing being faced with the mirrors 15 and 16, and the back of the housing carrying the window 19.

Various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. The combination with an automobile including a hollow top defining an unobstructed passageway from the front to the rear thereof, of a train of image reflecting elements including reflectors at the rear of the passageway and reflectors at the front of the passageway, one of said latter reflectors being arranged in position for observation by the driver of the car and disclosing through the intermediacy of said train and through said passage an unobstructed view of the road behind the automobile.

2. The combination with an automobile, including a hollow top defining an unobstructed passageway from the front to the rear thereof, of a pair of oppositely facing mirrors arranged at the rear of the passageway and inclined at approximately 45° to the plane thereof, one mirror reflecting the image of the road behind the car onto the other, and a mirror at the front of said passageway presenting to the driver's view, a reflection from said other mirror.

3. The combination with an automobile, including a hollow top defining an unobstructed passageway from the front to the rear thereof, of a pair of oppositely facing mirrors arranged at the rear of the passageway and inclined at approximately 45° to the plane thereof, one mirror reflecting the image of the road behind the car onto the other, and a mirror at the front of said passageway presenting to the driver's view, a reflection from said other mirror, the front mirror being secured adjacent the upper end of the wind shield.

4. The combination with an automobile, including a hollow top defining an unobstructed passageway from the front to the rear thereof, of a pair of oppositely facing mirrors arranged at the rear of the passageway and inclined at approximately 45° to the plane thereof, one mirror reflecting the image of the road behind the car onto the other, and a mirror at the front of said passageway presenting to the driver's view, a reflection from said other mirror, the front mirror being secured adjacent the upper end of the wind shield, and a forwardly facing mirror coacting therewith upon the lower part of the front mirror, images received through the hollow roof upon the upper portion of the concave mirror.

5. The combination with an automobile, including a hollow top defining an unobstructed passageway from the front to the rear thereof, of a pair of oppositely facing mirrors arranged at the rear of the passageway and inclined at approximately 45° to the plane thereof, one mirror reflecting the image of the road behind the car onto the other, a mirror at the front of said passageway presenting to the driver's view, a reflection from said other mirror, and a box like housing protecting the two rear mirrors and having a window in its rear side.

6. A device as set forth in claim 4 and wherein the forwardly facing mirror is mounted in a cutaway portion at the forward end of the ceiling.

7. The combination with an automobile including a hollow top defining an unobstructed passageway from the front to the rear thereof, of a train of image reflecting elements, including reflecting means at the rear of the passageway, and reflecting means at the front of the passageway, said last mentioned reflecting means including a reflector arranged in position for observation by the driver of a car, and disclosing through the intermediacy of said train and through said passageway an unobstructed view of the road behind the automobile.

CARL W. PAUL.